United States Patent
Perez

(10) Patent No.: US 10,689,090 B2
(45) Date of Patent: Jun. 23, 2020

(54) AIRCRAFT COMPRISING A CLEARANCE BETWEEN AN OPENING AND A DOOR WHICH COMPRISES AN UPSTREAM EDGE WITH A SHARP EDGE

(71) Applicant: Airbus Operations S.A.S., Toulouse (FR)

(72) Inventor: David Perez, Saiguede (FR)

(73) Assignee: Airbus Operations S.A.S. (FR)

( * ) Notice: Subject to any disclaimer, the term of this patent is extended or adjusted under 35 U.S.C. 154(b) by 475 days.

(21) Appl. No.: 15/625,088

(22) Filed: Jun. 16, 2017

(65) Prior Publication Data

US 2017/0369146 A1    Dec. 28, 2017

(30) Foreign Application Priority Data

Jun. 22, 2016   (FR) ..................... 16 55809

(51) Int. Cl.
*B64C 1/14*    (2006.01)

(52) U.S. Cl.
CPC .......... *B64C 1/1461* (2013.01); *B64C 1/1407* (2013.01); *B64C 1/1423* (2013.01)

(58) Field of Classification Search
CPC .... B64C 1/1461; B64C 1/1407; B64C 1/1423
See application file for complete search history.

(56) References Cited

U.S. PATENT DOCUMENTS

| 3,296,742 A * | 1/1967 | Radcliffe | E06B 7/18 |
| | | | 49/319 |
| 5,868,355 A * | 2/1999 | Carter, Jr. | B63B 19/08 |
| | | | 114/117 |
| 2011/0042517 A1* | 2/2011 | Depeige | B64C 1/14 |
| | | | 244/129.5 |
| 2014/0345199 A1* | 11/2014 | Yahata | B64C 1/14 |
| | | | 49/475.1 |

FOREIGN PATENT DOCUMENTS

| DE | 10 2014 109108 A1 | 1/2016 |
| WO | 2007/107861 A1 | 9/2007 |

OTHER PUBLICATIONS

FR 16 55809 Search Report dated Jan. 23, 2017.

\* cited by examiner

*Primary Examiner* — Rodney A Bonnette
(74) *Attorney, Agent, or Firm* — Lerner, David, Littenberg, Krumholz & Mentlik, LLP

(57) ABSTRACT

An aircraft includes a clearance between an opening and a door. The clearance communicates with a cavity and is oriented in a direction intersecting a flow direction of an air flow to the outside of the aircraft in flight. The aircraft further includes an upstream edge and an upstream outer surface situated in front of the clearance joined by a sharp edge with a bend radius of less than or equal to 1 mm, in order to limit the incidence of aerodynamic noise.

5 Claims, 1 Drawing Sheet

AIRCRAFT COMPRISING A CLEARANCE BETWEEN AN OPENING AND A DOOR WHICH COMPRISES AN UPSTREAM EDGE WITH A SHARP EDGE

FIELD OF THE INVENTION

This application relates to an aircraft comprising a clearance between an opening and a door which comprises an upstream edge with a sharp edge.

BACKGROUND OF THE INVENTION

As illustrated in FIG. 1, an aircraft 10 comprises a fuselage 12 which extends from a front point 14 to a rear point 16 and an airfoil 17 joined to the fuselage 12.

In the description that follows a longitudinal direction DL is parallel to an axis of the aircraft which extends from the front point 14 to the rear point 16. A longitudinal plane is a plane passing through the axis of the aircraft. A transverse plane is a plane perpendicular to the longitudinal direction DL. The concepts of front Av or upstream and rear Ar or downstream refer to the flow direction of the air flow 18 to the outside of the fuselage 12, in flight, the air flow 18 moving from the front Av or upstream towards the rear Ar or downstream.

The fuselage 10 comprises a structure supporting a skin 20 which separates the inside and outside of the aircraft. According to one embodiment, the skin comprises a plurality of thin panels which are juxtaposed.

As illustrated in FIGS. 1, 2A and 2B, the fuselage 10 comprises at least one opening 22 (shown in FIG. 2B) and, for each opening, at least one door 24 movable between a closed position (shown in FIG. 2A), in which the door 24 closes the opening 22, and an open position (shown in FIG. 2B), in which the door 24 frees the opening 22, at least in part. The door 24 is joined to the fuselage by a hinge configured to allow a change in position of the door between the closed position and the open position and a locking system configured to keep the door in the closed position.

According to one application, the opening 22 is provided to allow individuals to enter a cabin of the aircraft 10.

The opening 22 is delimited by a front edge 26 disposed in a first transverse plane, a rear edge 28 disposed in a second transverse plane parallel to the first transverse plane and offset towards the rear in respect of the first transverse plane, an upper edge 30 and a lower edge 32 parallel to the longitudinal direction, the different edges being joined by curved portions.

The opening 22 comprises a frame 34 which forms the edge of the opening and which comprises a front post 36 (shown in FIGS. 2B and 3), a rear post, an upper crosspiece and a lower crosspiece positioned level with the front edge 26, the rear edge 28, the upper edge 30 and the lower edge 32, respectively.

The opening 22 likewise comprises at least a front plate 38 mounted against the front post 36 and which comprises an outer face 38F disposed in the extension of the outer surface of the skin 20 of the fuselage 12. This front plate 38 comprises a front edge 38C which corresponds to the front edge 26 (shown in FIGS. 3 and 4).

The opening 22 likewise comprises at least one corner piece 40 supported by the front post 36, said corner piece 40 comprising a wing 42 projecting in respect of the front post 36, parallel to the plate 38 and offset towards the inside of the fuselage in respect of said plate 38.

The door 24 comprises a chassis 44 and a panel 46, supported by the chassis 44, which comprises an outer face 46F disposed in the extension of the outer surface of the skin 20 of the fuselage 12.

This panel 46 comprises a front edge 48, a rear edge 50, an upper edge 52 and a lower edge 54 closely spaced in relation to the front edges 26, rear edges 28, upper edges 30 and lower edges 32 of the opening 22, respectively. Hence, a narrow clearance 56 is provided between the plate 38 of the opening 22 and the panel 46 of the door 24.

The door 24 likewise comprises at least one front joint 58 configured to rest against the wing 42 of the opening 22 when the door 24 is in the closed position. Hence, the front joint 58, the front post 36, the wing 42, the front plate 38 and the panel 46 of the door 24 delimit a cavity 60, when the door 24 is in the closed position, which communicates with the outside of the aircraft via the clearance 56.

As illustrated in FIG. 4, the outer face 38F and the front edge 38C of the front plate 38 are joined by a curved profile 62 with a bend radius of more than 2 mm. In parallel, the outer face 46F and the front edge 48 of the panel 46 of the door 24 are joined by a curved profile 64 with a bend radius of more than 2 mm.

This configuration generates aerodynamic noise, the air flow tending to be aspirated in the cavity 60 passing through the clearance 56, as illustrated in FIG. 3.

BRIEF SUMMARY OF THE INVENTION

The present invention aims to correct the disadvantages of the prior art.

To this end, an embodiment of the invention is an aircraft which comprises:
  an opening,
  a door configured to close the opening in the closed position,
  a clearance between said opening and said door when said door is in the closed position, said clearance communicating with a cavity and being oriented in a direction intersecting a flow direction of an air flow to the outside of the aircraft in flight,
  an upstream outer surface situated in front of the clearance against which the air flow flows,
  an upstream edge which delimits the clearance and which is situated in front of the clearance,
  wherein the upstream edge and the upstream outer surface are joined by a sharp edge with a bend radius of less than or equal to 1 mm.

This configuration allows aspiration phenomena of the air flow flowing to the outside of the aircraft in the clearance and therefore the incidence of aerodynamic noise to be limited.

The sharp edge advantageously has a bend radius of between 0.5 mm and 1 mm.

The sharp edge preferably extends over the entire length of the upstream edge.

According to one configuration, the upstream edge is positioned in front of the door in the flow direction of the air flow.

According to one application, the door is a door of a passenger cabin.

BRIEF DESCRIPTION OF THE DRAWINGS

Other characteristics and advantages will emerge from the description which will follow the invention, a description provided simply by way of example with reference to the attached drawings in which.

DETAILED DESCRIPTION

Figures 5, 6:
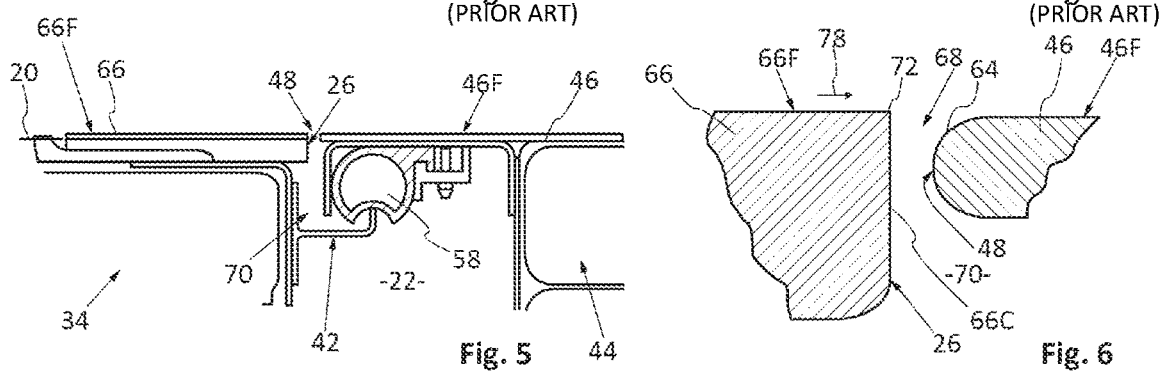
FIG. 5 is a partial longitudinal section of a frame and of a door which illustrates an embodiment of the invention.
FIG. 6 is a longitudinal section of a front plate and of a door panel which illustrates in detail an embodiment of the invention.

FIG. 5 shows a front edge 26 of an opening 22 provided at the fuselage 12 of an aircraft 10.

As for the prior art, the opening 22 is delimited by the front edge 26 disposed in a first transverse plane, a rear edge 28 disposed in a second transverse plane parallel to the first transverse plane and offset towards the rear in respect of the first transverse plane, an upper edge 30 and a lower edge 32 parallel to the longitudinal direction, different edges being joined by curved portions.

Figure 1:
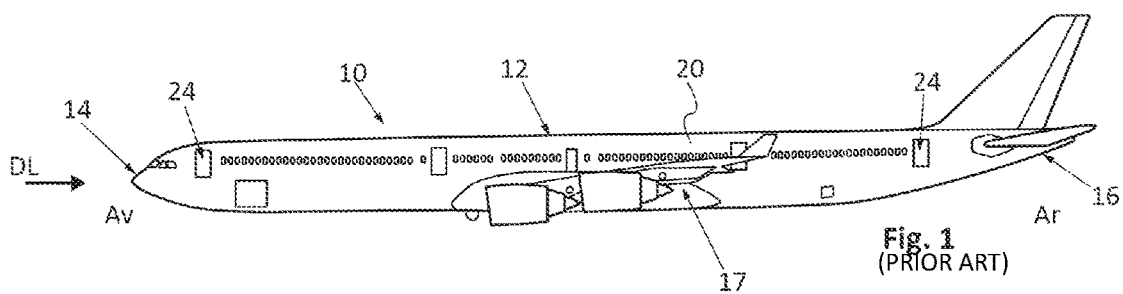
FIG. 1 is a side view of an aircraft.
Figures 2A, 2B:
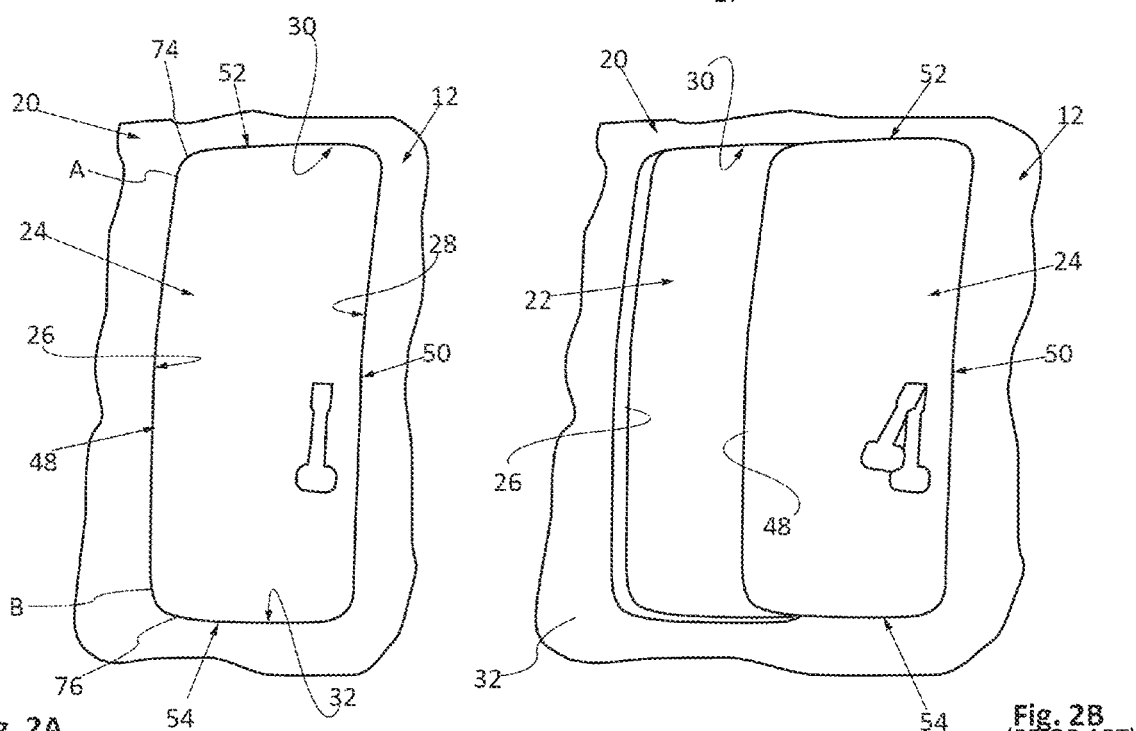
FIGS. 2A and 2B are side views of part of the fuselage of the aircraft shown in FIG. 1 which illustrate a door in the closed position and in the open position, respectively.
Figures 3, 4:
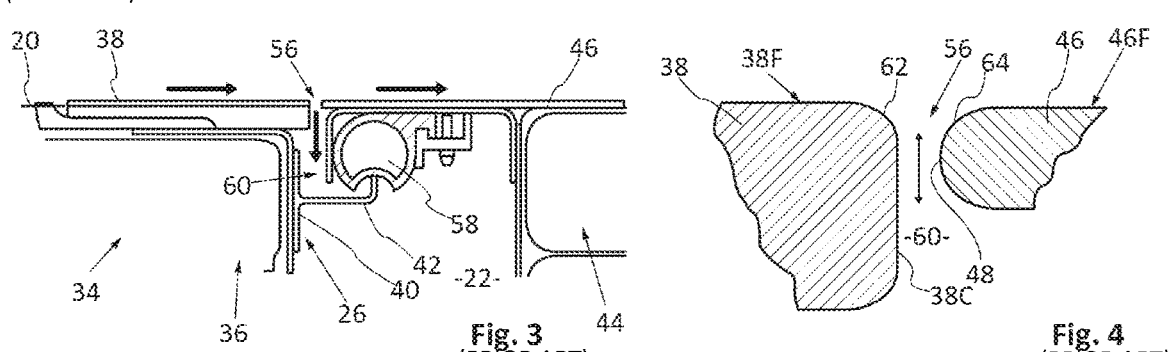
FIG. 3 is a partial longitudinal section of a frame and of a door which illustrates an embodiment of the prior art.
FIG. 4 is a longitudinal section of a front plate and of a door panel which illustrates in detail an embodiment of the prior art.

The opening 22 comprises a frame 34 which forms the edge of the opening and which comprises a front post 36 (shown in FIGS. 2B and 5), a rear post, an upper crosspiece and a lower crosspiece positioned at the front edge, the rear edge, the upper edge and the lower edge, respectively.

The door 24 comprises a chassis 44 and a panel 46 supported by the chassis 44 and which comprises an outer face 46F disposed in the extension of the outer surface of the skin 20 of the fuselage 12.

This panel 46 comprises a front edge 48, a rear edge, an upper edge and a lower edged closely spaced from the front edges 26, rear edges, upper and lower edges, of the opening 22, respectively. As illustrated in FIG. 6, the outer face 46F and the front edge 48 of the panel 46 of the door 24 are joined by a curved profile 64 with a bend radius of more than 2 mm.

The door 24 likewise comprises at least one front joint 58 configured to rest against a wing 42 supported by the frame 34 of the opening 22 when the door 24 is in the closed position.

All the components are shared with the prior art and referred to using the same reference numbers.

The opening 22 likewise comprises at least one front plate 66, mounted against the front post 36, which comprises an outer face 66F disposed in the extension of the outer surface of the skin 20 of the fuselage 12. This front plate 66 comprises a front edge 66C which forms the front edge 26 (shown in FIG. 6).

The front edge 66C of the front plate 66 of the opening 22 is separated from the front edge 48 of the panel 46 of the door 24 by a narrow clearance 68 which joins the outside of the aircraft with a cavity 70 delimited by the front plate 66, the front post 36, the wing 42, the front joint 58, the panel 46 of the door 24.

According to a characteristic of the invention, the outer face 66F and the edge 66C of the front plate 66 of the opening 22 are joined by a sharp edge 72. By "sharp edge", it is meant that the edge 72 has a bend radius of less than or equal to 1 mm.

This sharp edge 72 preferably extends over the entire length of the front edge 26, between a first end A situated at the junction of the front edge 26 and a curved portion 74 joining the front edge 26 and the upper edge 30 and a second end B situated at the junction of the front edge 26 and a curved portion 76 joining the front edge 26 and the lower edge 32. According to one embodiment, the sharp edge 72 extends from the upper edge 30 to the lower edge 32.

Advantageously, the sharp edge 72 has a bend radius of between 0.5 mm and 1 mm.

The invention allows the aerodynamic noise associated with the presence of the cavity 70 and/or the clearance 68 to be suppressed, the shape of the sharp edge 72 upstream of the clearance 68 limiting the aspiration phenomena of the air flow 78 flowing to the outside of the aircraft in the clearance 68.

Although described as being applied to the front edge of a door of a passenger cabin, the invention is not limited to this type of door and may be applied to any doors of the aircraft. "Door" should be taken to mean a mobile element (door, hatch or other) configured to close an opening, one face of which is in contact with the air flow flowing to the outside of the aircraft.

Hence, the invention may be applied to all upstream edges situated in front of a clearance provided between an opening and a door, said clearance being oriented in a direction intersecting a flow direction of an air flow to the outside of the aircraft in flight, whatever the dimensions of the door. Hence, the rear edge 50 of the door may be joined to the outer face 46F of the panel 46 by a sharp edge in accordance with the invention, to suppress the aerodynamic noise associated with the presence of a clearance between the door and the skin of the fuselage and/or of a cavity communicating with said clearance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   an opening;
   a door configured to close the opening in the closed position;
   a clearance between said opening and said door when said door is in the closed position, said clearance communicating with a cavity and being oriented in a direction intersecting a flow direction of an air flow to the outside of the aircraft in flight;
   an upstream outer surface situated in front of the clearance against which the air flow flows; and
   an upstream edge delimiting the clearance and situated in front of the clearance,
   wherein the upstream edge and the upstream outer surface are joined by a sharp edge with a bend radius of less than or equal to 1 mm.

2. The aircraft as claimed in claim 1, wherein the sharp edge has a bend radius of between 0.5 mm and 1 mm.

3. The aircraft as claimed in claim 1, wherein the sharp edge extends over the entire length of the upstream edge.

4. The aircraft as claimed in claim 1, wherein the upstream edge is positioned in front of the door in the flow direction of the air flow.

5. The aircraft as claimed in claim 1, wherein the door is a door of a passenger cabin.

\* \* \* \* \*